Nov. 5, 1935.　　　T. S. BOYD　　　2,020,100
MANICURING STAND
Filed Nov. 16, 1933
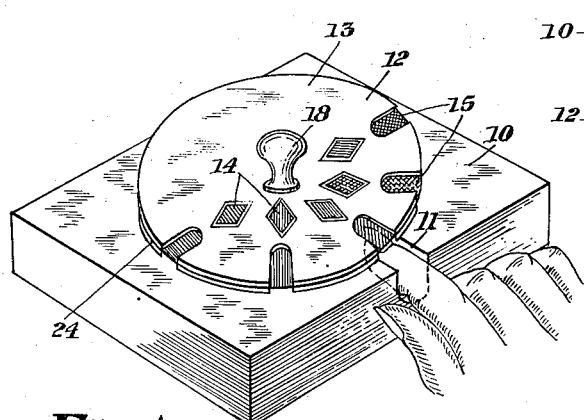
Fig. 1
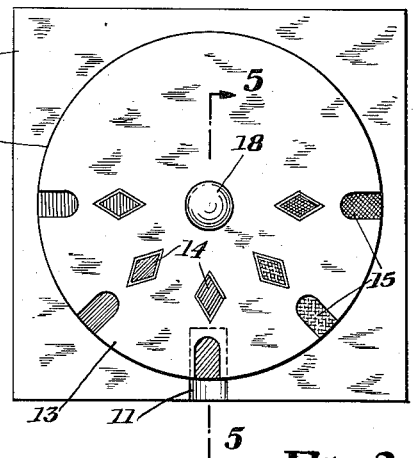
Fig. 3
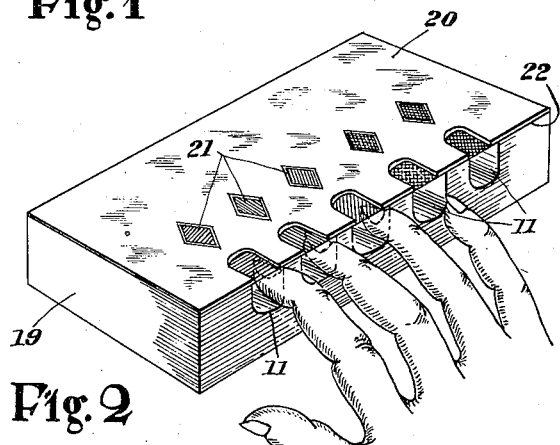
Fig. 2
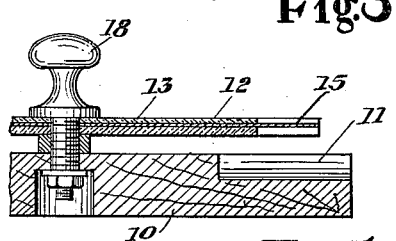
Fig. 5
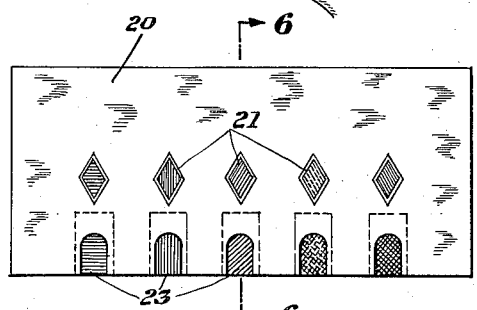
Fig. 4
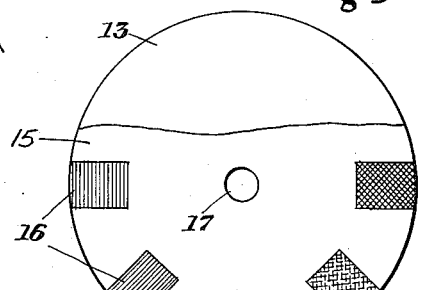
Fig. 7
Fig. 6
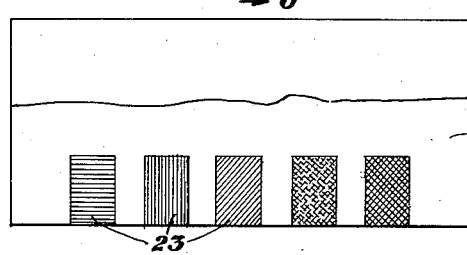
Fig. 8
INVENTOR
J. Sherwood Boyd
BY
Mock & Blum
ATTORNEYS Patented Nov. 5, 1935

2,020,100

UNITED STATES PATENT OFFICE 2,020,100

MANICURING STAND

Thomas Sherwood Boyd, Yonkers, N. Y., assignor to Northam Warren Corporation, New York, N. Y., a corporation of New York Application November 16, 1933, Serial No. 698,261

4 Claims. (Cl. 35—59)

This invention relates to improvements in manicuring stands and more particularly to manicuring stands used for the purpose of choosing an appropriate nail polish tint for the finger nails.

A further object of this invention is the provision of an improved manicure stand in which the appropriate shade of nail polish may be chosen for the finger nails by the comparison of said shade in connection with the finger nail itself without the application of any actual tint or coloring to the finger nail.

Further objects will be apparent from the specification and drawing in which:

Fig. 1 is a perspective view of one form of the device.

Fig. 2 is a perspective view of another embodiment.

Fig. 3 is a top plan view of the article shown in Fig. 1.

Fig. 4 is a top plan view of the article shown in Fig. 2.

Fig. 5 is a vertical section along the line 5—5 of Fig. 3.

Fig. 6 is a vertical section along the line 6—6 of Fig. 4.

Fig. 7 is a plan view of the transparent sheet bearing thereon a series of color shades.

Fig. 8 is a plan view of a similar sheet used in the embodiment shown in Fig. 2.

10 is the base having the finger cut-outs 11. On the top of the base 10 is a revolving disc 12 having a peripherally notched opaque top 13 upon which are printed, painted, or otherwise affixed a series of color shades 14, here indicated in diamond shaped figures, it being understood that each diamond shaped figure is of a color different in shade from every other diamond shaped figure.

Below the top member 12 is a second circular sheet 15, a plan view of which is shown in Fig. 7. The member 15 is preferably made of a transparent material such as celluloid, thick cellophane, or similar article and upon which are superimposed a series of colored rectangles 16, which correspond to the shades 14 and are disposed within the several notches of the revolving disc 12.

The members 12 and 15 have an opening 17 upon which the disc 12 is revoluble, a knob 18 fitting in said opening and holding the disc 12 in place.

In the form of embodiment shown in Fig. 2 it will be apparent that a number of fingers can be inserted into the device at one time for the purpose of the comparison of the different shades of nail tints which may be used.

The base 19 has a cover 20 having a series of diamond shaped figures 21 thereon, said diamond shaped figures varying in color from each other.

The cover member 20 is provided, along one edge, with a plurality of notches each generally corresponding in shape to a finger nail and below the member 20 is a transparent sheet of celluloid or similar material 22 having on the upper surface thereon a series of rectangular colored figures 23. The colors in the figures 23 correspond exactly in shade to the diamond shaped figures 21 opposite each one.

Below the circular sheet 15 is an opaque sheet of cardboard or similar material of the same size and notched character, designated as number 24 in the drawing, the transparent sheet 15 being placed between two opaque sheets, namely, 13 and 24 providing translucent peripheral portions corresponding, generally, in shape to a finger nail.

It will be noted that both the disc 15 and the rectangular sheet 22 are made of transparent material such as celluloid or thick cellophane and the appropriate nail color tints are superimposed upon said disc 15 and sheet 22 on the upper surfaces thereof. This has the advantage of permitting all the nail polish tints to appear in graduated relation to each other all on the same sheet, whereas if these particular members 15 and 22 were made of colored celluloid or colored cellophane to show the appropriate nail tints in question, it would be necessary to have a series of such colored strips to make up either the member 15 or the member 22.

The operation of the device may be readily ascertained from an inspection of Figs. 1 and 2 of the drawing, where in the embodiment shown as Fig. 1 a single finger is inserted in the opening 11 and then the disc 15 is revolved so as to show the various tints of nail polish over each finger nail successively.

It should be observed that the colors on the discs 15 or 22 are not opaque but are translucent just as the nail polish itself, so that an accurate comparison may be made between the nail polish just as it is applied to the finger nail and the shades as they appear upon the disc 15.

In the embodiment shown as Fig. 2, there is the further advantage that a number of nail shades may be compared with each other at the same time, as three or four fingers can be inserted into the stand shown in Fig. 2 at one time.

The finger cut-outs 11 are naturally shaped to conform to the shapes of the fingers themselves.

Having fully described my invention, what I claim is:

1. In a manicure stand, a base, a series of delicately-tinted translucent nail-shading members, each of which shading members corresponds, in color-heightening value, to an applied coating of one of several distinct, standard, nail-tinting lacquers, said base being provided with socket means for receiving and supporting a finger of the human hand in outstretched position upwardly exposing the nail thereof to view through a selected one of said nail-shading members to determine the resultant color-heightening effect of the corresponding standard nail-tinting lacquer upon the natural coloring of the nail of the supported finger.

2. In a manicure stand, a base, said base being provided with a plurality of spaced sockets for individually receiving and supporting each of several fingers of the human hand in outstretched position upwardly exposing the nails thereof, and a series of delicately-tinted translucent nail-shading members each of which corresponds, in color-heightening value, to an applied coating of one of several distinct standard, nail-tinting lacquers, said nail-shading members being carried by said base and disposed, one over each of said finger-receiving sockets, for effecting a colored shading of each socket-received finger nail equivalent to the color-heightening effect of an applied coating of the corresponding standard lacquer.

3. In a manicure stand, a base, said base being provided with socket means for receiving and supporting a finger of the human hand in outstretched position upwardly exposing the nail thereof, a disc member disposed above said socket means and journaled for rotation upon said base, and a graduated series of delicately-tinted, translucent, nail-size windows radially arranged in said disc, each of which windows corresponds, in color-heightening value, to an applied coating of one of several distinct, standard nail-tinting lacquers, each of said windows being selectively disposable, by rotation of said disc, into superposed relation with respect to the nail of the finger supported in said socket means to effect a selective colored shading of the said nail which is equivalent to the color heightening effect of an applied coating of the corresponding standard lacquer.

4. In a manicure stand, a base, a finger-receiving socket formed in said base and consisting of a notch cut into the upper surface and extending to the periphery thereof, and a plurality of distinctly-tinted, translucent nail-shading members carried by said base and selectively alineable with said socket, each of said translucent members being tinted a distinct shade corresponding, in effect, to the color heightening value of a standard nail-tinting lacquer.

T. SHERWOOD BOYD.